United States Patent [19]

Baeger et al.

[11] 4,422,727
[45] Dec. 27, 1983

[54] LACQUER, WITH INORGANIC FILLER, COATING DISPLAY-ELEMENT'S POLARIZER

[75] Inventors: Holm Baeger, Bad Soden; Hans Wedel, Mühltal, both of Fed. Rep. of Germany

[73] Assignee: VDO Adolf Schindling AG, Fed. Rep. of Germany

[21] Appl. No.: 197,687

[22] Filed: Oct. 16, 1980

[30] Foreign Application Priority Data

Nov. 2, 1979 [DE] Fed. Rep. of Germany ....... 2944325

[51] Int. Cl.³ .............................................. G02F 1/133
[52] U.S. Cl. ..................................... 350/334; 350/337
[58] Field of Search ........... 350/339 R, 339 D, 339 F, 350/337, 370, 334; 252/587

[56] References Cited

U.S. PATENT DOCUMENTS 3,984,176 10/1976 Hirai et al. ....................... 350/345 X
4,130,672 12/1978 Onoki et al. ..................... 350/164 X
4,155,122 5/1979 Budmiger ..................... 350/339 F X
4,268,127 5/1981 Oshima et al. ............. 350/339 D X

FOREIGN PATENT DOCUMENTS 1133348 11/1968 United Kingdom ................ 252/587

Primary Examiner—John K. Corbin
Assistant Examiner—David Lewis
Attorney, Agent, or Firm—Eric P. Schellin

[57] ABSTRACT

A passive electro-optical indicating element for displaying information, such as alpha-numerical characters having two spaced, transparent electrode supports which together enclose a liquid crystal substance and are provided on their surfaces opposite said liquid crystal substance with respective polarizers, have the surface facing the observer of the polarizer located on the front electrode support coated with a thin layer of a transparent curable lacquer, in which inorganic fillers are suspended in the prepared lacquer in an amount between 2 and 10 percent by weight.

2 Claims, 2 Drawing Figures

LACQUER, WITH INORGANIC FILLER, COATING DISPLAY-ELEMENT'S POLARIZER

FIELD OF THE INVENTION

A passive electro-optical indicating element to display information, such as alpha-numerical characters, having two spaced, transparent electrode supports, which enclose a liquid crystal substance and which are provided with a polarizer on their respective outside surfaces.

PRIOR ART

Indicating elements of the prior art have the disadvantage that the polarizer glued to the front electrode support, which is generally formed as a polarization filter-foil, may cause such significant reflections, that a precise reading of the indicating element is no longer possible. As long as this type of indicating element is movable with respect to the observer, as is the case for example with the indicating elements built into wristwatches, this type of reflection can be easily overcome by moving the indicating element. This is not possible, however, if the indicating element cannot be moved relative to the observer, as is the case when the indicating element is directly or indirectly built into a motor vehicle or is located in a stationary housing, such as a large clock.

To avoid these reflections it has already been proposed to form the indicating instrument polarizer facing the observer in a convex shape. This achieves quite good results, but the disadvantages of this convex curvature are the increased space requirements of such an indicating element and the higher costs of production relative to an indicating element which has not been thus made non-reflective.

SUMMARY OF THE INVENTION

The primary object of the invention is to overcome the disadvantages of the prior art. Another object of the invention is to improve a passive electro-optical indicating element of the above-described type in such a manner that reflections through the polarizer are avoided or at least are reflected to a degree which is no longer bothersome.

Other objects and advantages of the invention will become apparent to those skilled in the art from the following description, claims and drawings.

DESCRIPTION OF THE PREFERRED EMBODIMENTS

Figure 1:
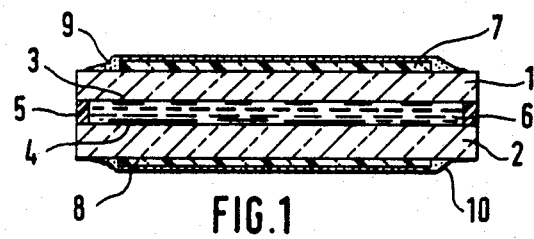
FIG. 1 is a longitudinal section through a passive electro-optical element.

In accordance with the invention the surface facing the observer of the polarizer located on the front electrode support is covered with a thin layer of clear, curable lacquer, in which inorganic fillers are suspended in the prepared lacquer in an amount between 2 and 10 percent by weight.

The suspension of the inorganic fillers in the clear curable lacquer creates an unevenness in its surface because of which light impinging upon the surface is no longer reflected in a bundle. Instead, the reflected light is diffused, eliminating the reflections which inhibit the reading of the indicating element. Since the lacquer coating can be relatively thin, the structural volume of the indicating element is practically not increased by these measures. Of particular advantage in the invention is that with proper selection of the clear curable lacquer, the lacquer coating can serve simultaneously as mechanical protection for the polarizer. Because of its softness the polarizer is very susceptible to scratching, so that often special measures must be taken to protect it mechanically. After applying the lacquer coating this is no longer necessary.

In a particularly advantageous embodiment of the invention the applied coating extends beyond the polarizer surface and the edge of the coating lies on the electrode support. It has been shown that the edge of the coating is so tightly joined to the electrode support that the polarizer's protection against climatic influences is also increased. Contrary to the experiences with polarizers of the prior art, in which the influences of the climate result in the polarizers bleaching out from the edges inward and losing their polarizing effect and in which the polarizer can separate spotwise from the electrode supports, resulting in uneven polarization effects which lead to a speckled display, coating the polarizer with the clear, curable lacquer can significantly decrease all of the disadvantages caused by the influences of the climate and even completely eliminate the effects of all but the largest fluctuations on the indicating element.

It is thus clearly seen that as the proportion of inorganic fillers in the lacquer increases, the transparency and ability of the lacquer to reflect decrease, while with decreasing proportions of fillers the transparency improves together with the reflective capacity of the lacquer coating. It has therefore proven to be effective for a wide range of applications to suspend an amount of inorganic filler materials in the lacquer of from 2 to 10 percent, preferably between 4 to 6 percent by weight.

Basically, any inorganic filler can be used as the filler material. However, silicon dioxide has proven particularly effective, since it results in an especially low decrease in the transparency of the lacquer. The particle size of the filler should lie in the micrometer range.

According to one advantageous embodiment of the invention an alkyd resin lacquer is provided as the lacquer. This lacquer is especially well suited for the present purpose because of its mechanical and climatic characteristics. Also advantageous is the use of a polyurethane lacquer, which also has favorable characteristics with regard to scratch resistance, temperature and moisture behavior.

Because the drying time of the lacquer has a certain influence on the quality of the transparency and the nonreflective effect of the lacquer coating, preferably a two-component lacquer is to be used, since by varying the quantity of hardener the desired curing time can be easily adjusted.

The indicating element comprises two transparent electrode supports 1 and 2, on whose adjacent sides the electrodes 3 and 4 are disposed. The two electrode supports are connected with each other by a frame 5. The space formed by the electrode supports and the frame opposite the electrodes, to which the support 5 is glued, is filled with a liquid crystal substance 6. Respective polarizers 7 and 8, made for instance from polyvinylacetate, are provided on the surfaces of the transparent supports opposite the liquid crystal substance.

Figure 2:
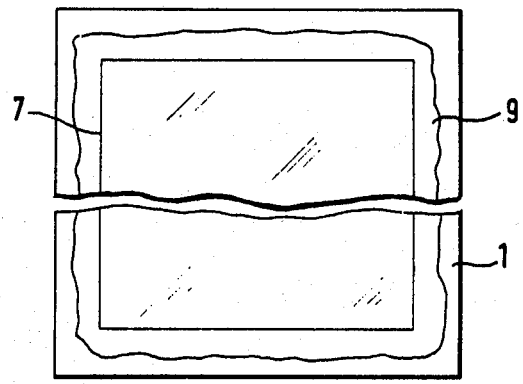
FIG. 2 is a plan view of the indicating element according to FIG. 1.

The polarizer 7 facing the observer is coated with a thin layer 9 of a transparent curable lacquer having filler material suspended therein in a quantity of about 4 percent by weight. As can be seen from FIG. 2, this layer 9 extends beyond the surface of the polarizer 7 onto the electrode support 1, whereby the polarizer 7 is surrounded by protective elements.

In the present case the polarizer 8 on the back side of the indicating element is also coated with a lacquer layer of the same lacquer material. This lacquer layer, however, does not need to contain any filler material, although to simplify manufacture the same filler-containing material may be used for the lacquer layer 10 as for the lacquer layer 9.

What we claim as new and desire to secure by United States Letters Patent is:

1. A passive electro-optical indicating element for displaying information such as alphabetical and numerical characters, comprising:
   a front transparent electrode support;
   a back transparent electrode support, which together with said front transparent electrode support defines a cavity;
   a liquid crystal substance enclosed in said cavity formed by said front and back transparent electrode supports;
   a polarizer arranged on the surface of each said front and back transparent electrode supports opposite said liquid crystal substance;
   a thin coating of a transparent curable lacquer applied to the outside surface of the polarizer arranged on said front electrode support, said coating of a transparent curable lacquer including an inorganic filler of silicon dioxide suspended therein in an amount between 2 and 10 percent by weight of the prepared lacquer.

2. An indicating element as claimed in claim 1, wherein said lacquer is an alkyd resin lacquer.

* * * * *